(12) United States Patent
Krantz et al.

(10) Patent No.: US 7,263,078 B2
(45) Date of Patent: Aug. 28, 2007

(54) METHOD AND APPARATUS FOR SCANNING IN WIRELESS COMPUTING DEVICES

(75) Inventors: Anton W. Krantz, Kirkland, WA (US); Abhishek Abhishek, Woodinville, WA (US); Arun Ayyagari, Seattle, WA (US); Jiandong Ruan, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1054 days.

(21) Appl. No.: 10/323,043

(22) Filed: Dec. 18, 2002

(65) Prior Publication Data

US 2004/0120278 A1 Jun. 24, 2004

(51) Int. Cl.
*H04Q 7/00* (2006.01)

(52) U.S. Cl. ..................................... 370/328

(58) Field of Classification Search ............... 370/328, 370/329, 341–349; 455/434–436, 441, 450, 455/455, 464
See application file for complete search history.

(56) References Cited

U.S. PATENT DOCUMENTS

| | | | | |
|---|---|---|---|---|
| 5,517,677 A | * | 5/1996 | Moon | 455/161.1 |
| 5,809,419 A | * | 9/1998 | Schellinger et al. | 455/434 |
| 6,052,590 A | * | 4/2000 | Hicks et al. | 455/434 |
| 6,385,460 B1 | * | 5/2002 | Wan | 455/515 |
| 6,393,006 B1 | * | 5/2002 | Kajihara | 370/335 |
| 6,393,282 B1 | * | 5/2002 | Iimori | 455/432.1 |
| 6,807,163 B1 | * | 10/2004 | Shi | 370/337 |
| 2004/0023634 A1 | * | 2/2004 | Jeong et al. | 455/403 |

OTHER PUBLICATIONS

U.S. Appl. No. 10/124,737, filed Apr. 17, 2002, Bahl et al.
U.S. Appl. No. 10/124,721, filed Apr. 17, 2002, Bahl et al.
U.S. Appl. No. 10/141,662, filed May 8, 2002, Hernandez et al.
U.S. Appl. No. 09/805,500, filed Mar. 13, 2001, Ayyagari et al.

* cited by examiner

*Primary Examiner*—Dmitry Levitan
(74) *Attorney, Agent, or Firm*—Wolf, Greenfield & Sacks, P.C.

(57) ABSTRACT

A method and system for scanning in a wireless device having a wireless network interface card (NIC) is presented. The system has a scanning history table for storing scanning results and a scanning engine that adjusts the scanning period based upon a history of scanning results and commands the NIC to scan for available networks after the period has expired. The engine receives scan results from the NIC, stores the scan results in the scanning history table, determines a scanning period based upon a history of scan results, sets the scanning period, and commands the NIC to scan for available networks after the scanning period has expired. The engine is programmed to set the scanning period using an exponential function and to reset the scanning period to a default period if the scan results are different from a prior scan result or if a triggering event is received.

26 Claims, 3 Drawing Sheets

METHOD AND APPARATUS FOR SCANNING IN WIRELESS COMPUTING DEVICES

FIELD OF THE INVENTION

This invention relates generally to wireless computing devices and, more particularly, relates to power management in wireless computing devices.

BACKGROUND OF THE INVENTION

With the development and deployment of wireless networking devices such as laptop computers, personal digital assistant devices, etc. and infrastructures, consumers and businesses are increasingly being able to realize the benefits of true mobile computing, collaboration, and information exchange. No longer are business travelers required to carry an assortment of cables and search endlessly for an available data port simply to connect to a network to retrieve email messages, download files, or exchange information. No longer are companies and home consumers restrained in where they may access their networks by the location of the Ethernet jacks on the wall. Meeting participants and groups of friends may now form their own ad hoc networks without connecting cables between themselves or logging in to some preexisting network. They can log onto the network using a wireless protocol while running on battery power, thereby allowing even greater mobility However, while the concept of mobile computing on wireless networks is well accepted, the implementation of this concept has taken on many forms. That is, there now exists several different wireless protocol standards that are competing in the marketplace. These standards include 802.11b (also know as Wi-Fi for wireless fidelity), 802.11a (also know as Wi-Fi5), 802.11g, HomeRF, Bluetooth, Wireless 1394, HiperLAN2, UWB, ZigBee, etc. Each of these different standards have particular advantages and were and are being developed with particular applications and users in mind. One thing in common with these standard is the use of a wireless network interface card (NIC).

As mobile workers demand greater mobility, both inside the organization and when traveling, the mobile workers are limited by the lifetime of the battery powering the wireless device. The battery life is a major restriction on mobility. The wireless NIC is the third highest consumer of battery power in a laptop. In small form factor devices, the wireless NIC consumes a larger percentage of battery power than in a laptop. Most of that energy is used for wireless data transmissions. Since the amount of power a battery provides is limited, how to minimize power consumption to extend the operation time of the device powered by the battery is an important issue for those devices.

One of the functions the wireless NIC performs is scanning to determine which devices are in the range of the wireless networking device. A principle rationale for scanning is to migrate from one network to another network that is more preferred. For example, a more preferred network may be cheaper to operate than the other network. Existing services command the wireless NIC to perform a scan after a fixed period of time (e.g., 60 seconds) elapses regardless of what is going on. Each scan consumes power. There is no intelligence as to whether the device is associated, connected for the last hour, is sending traffic at the time the scan is starting, etc. This pollutes the radio space and wastes battery power. For example, if there are 300 stations and each one is scanning every 60 seconds, on average five stations will be running scans every second. When a scan is started on a network channel, a probe request is sent and other devices on the network channel cannot transmit while a device transmits the probe request. When devices see the probe request, the device that would respond to the probe request transmit a probe response, which in-turn consumes available time to transmit on the network channel. As a result, each time a scan is run, a slice of the available time to transmit on the network channel is taken away. If there are a number of devices scanning unnecessarily, the total time available is reduced and power is wasted.

BRIEF SUMMARY OF THE INVENTION

A method and system for scanning in a wireless device having a wireless network interface card (NIC) is presented. The system has a scanning history table for storing scanning results and a scanning engine that adjusts the scanning period based upon a history of scanning results and commands the NIC to scan for available networks after the period has expired.

The engine receives scan results from the NIC, stores the scan results in the scanning history table, determines a scanning period based upon a history of scan results, sets the scanning period, and commands the NIC to scan for available networks after the updated scanning period has expired.

The scanning period is determined by comparing the scan results to at least one prior scan result and increasing the scanning period if the scan results have not changed from the prior scan result. The scanning period is increased exponentially or in accordance with a user preference until a specified maximum time is reached.

The engine is programmed to set the scanning period using an exponential function and to reset the scanning period to a default period if the scan results are different from a prior scan result or if a triggering event is received.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
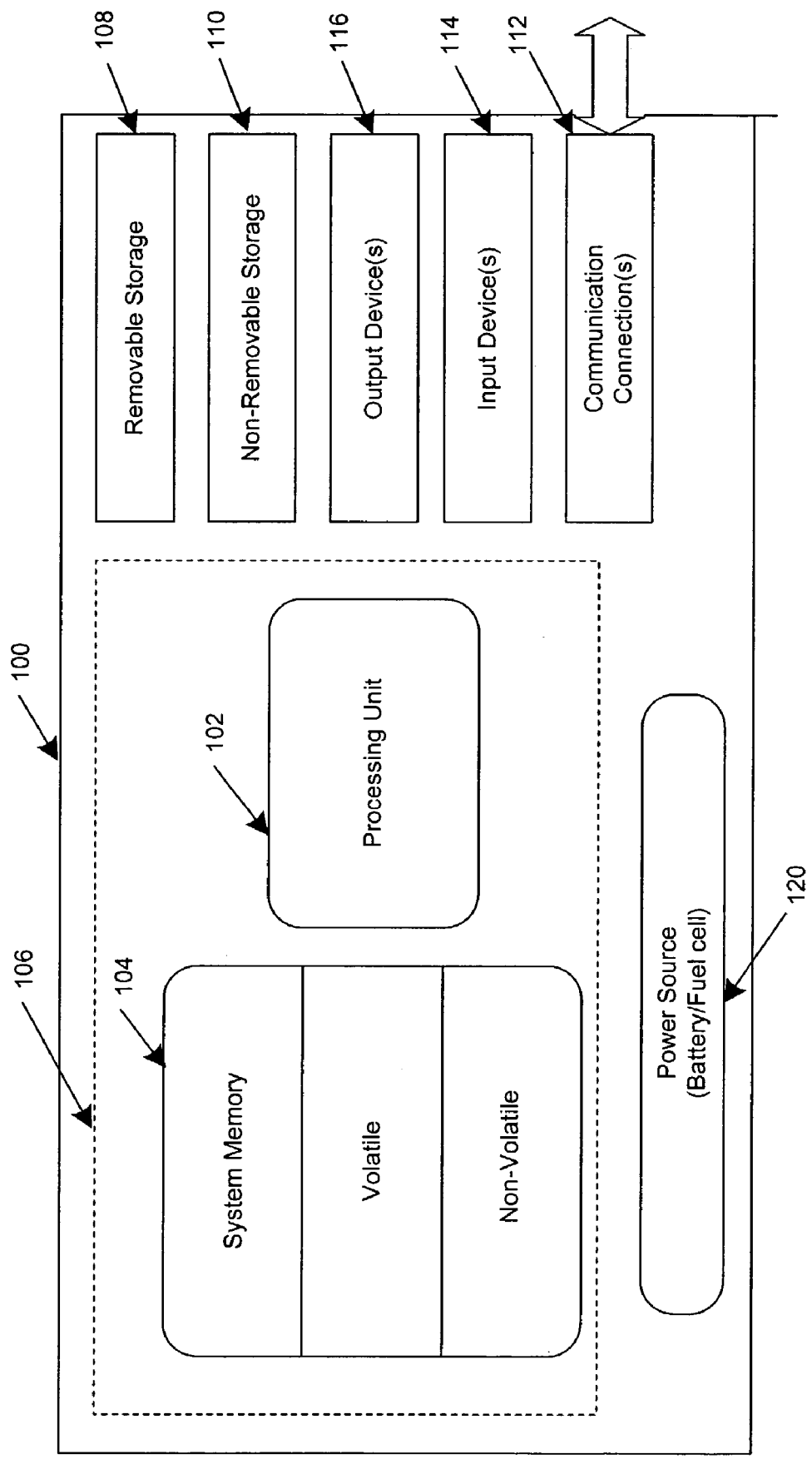
FIG. 1 is a block diagram generally illustrating the architecture of an exemplary computer device in which an embodiment of the invention may be implemented.

This invention operates in a wireless device having a network interface module for accessing a wireless network and a power source, such as a battery pack or the like, that has a limited amount of energy stored therein. Since the network interface module can consume a significant amount of power every time it scans, it is desirable to reduce the number of scans by increasing the time between the times that the network interface module performs a scan. The invention provides a scanning algorithm to do so. Prior to describing the invention in detail with reference to FIGS. 2-3, an exemplary computing device in which the invention may be implemented is first described with reference to FIG. 1.

The invention may be implemented in a system employing various types of machines, including cell phones, hand-held devices, wireless surveillance devices, microprocessor-based programmable consumer electronics, and the like, using instructions, such as program modules, that are executed by a processor. Generally, program modules include routines, objects, components, data structures and the like that perform particular tasks or implement particular abstract data types. The term "program" includes one or more program modules.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 shows an exemplary computing device 100 for implementing an embodiment of the invention. In its most basic configuration, the computing device 100 includes at least a processing unit 102 and a memory 104. Depending on the exact configuration and type of computing device, the memory 104 may be volatile (such as RAM), non-volatile (such as ROM, flash memory, etc.) or some combination of the two. This most basic configuration is illustrated in FIG. 1 by a dashed line 106. Additionally, the device 100 may also have additional features/functionality. For example, the device 100 may also include additional storage (removable and/or non-removable) including, but not limited to, magnetic or optical disks or tapes. Such additional storage is illustrated in FIG. 1 by a removable storage 108 and a non-removable storage 110. Computer storage media includes volatile and nonvolatile, removable and non-removable media implemented in any method or technology for storage of information such as computer readable instructions, data structures, program modules or other data. The memory 104, the removable storage 108 and the non-removable storage 110 are all examples of computer storage media. Computer storage media includes, but is not limited to, RAM, ROM, EEPROM, flash memory or other memory technology, CDROM, digital versatile disks (DVD) or other optical storage, magnetic cassettes, magnetic tape, magnetic disk storage or other magnetic storage devices, or any other medium which can be used to store the desired information and which can be accessed by the device 100. Any such computer storage media may be part of the device 100.

The device 100 may also contain one or more communications connections 112 that allow the device to communicate with other devices. The communications connections 112 are an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. As discussed above, the term computer readable media as used herein includes both storage media and communication media.

The device 100 may also have one or more input devices 114 such as keyboard, mouse, pen, voice input device, touch-input device, etc. One or more output devices 116 such as a display, speakers, printer, etc. may also be included. All these devices are well known in the art and need not be discussed at greater length here.

Figure 2:
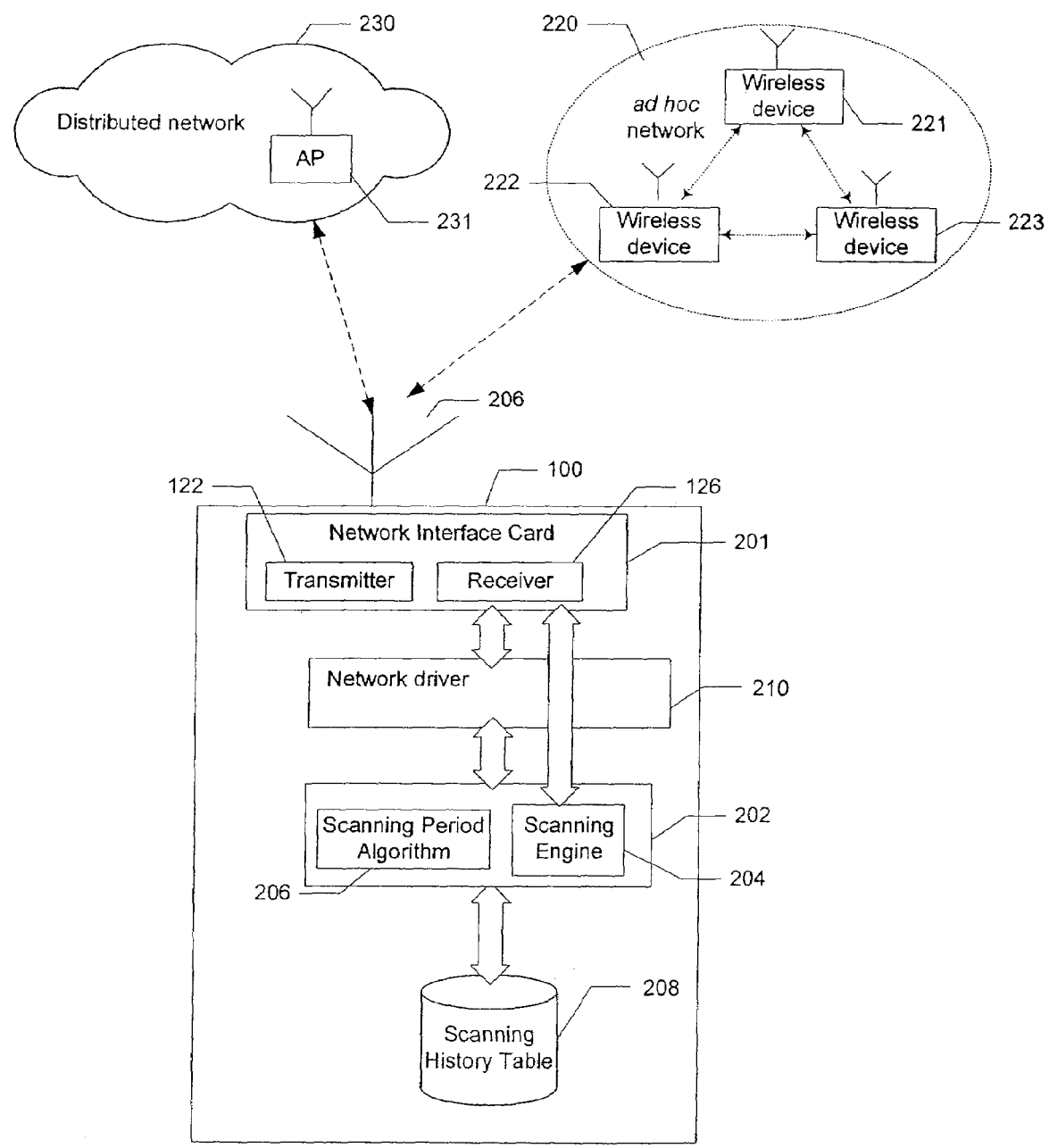
FIG. 2 is a schematic diagram illustrating an exemplary operation environment for a wireless computing device that implements an embodiment of the scanning scheme of the invention.

In keeping with the intended application of the invention, the device 100 is configured as a wireless mobile device. To that end, the device 100 is provided with a portable power source 120, such as a battery pack, a fuel cell, or the like. The power source 120 provides power for computations and wireless data transmissions by the device 100. As shown in FIG. 2, the wireless computing device 100 further includes a network interface card (NIC) 201 for wirelessly communicating with different types of wireless networks. The NIC 201 includes a transmitter 122, which is coupled to an antenna 206 for transmitting data wirelessly over a suitable frequency channel. A receiver 126 is also coupled to the antenna 206 for receiving communication packets wirelessly transmitted from the networks that the device is communicating with. The network interface module 201 and the antenna 206 are part of the communication connections 112 in FIG. 1. In one embodiment, the network interface module 201 employs wireless configuration service over the IEEE 802.11 wireless connections to ease network configuration, including infrastructure networks and ad hoc networks. An exemplary network interface module is Personal Computer Memory Card International Association PCMCIA wireless card. It will be appreciated that the interface type and physical configuration of the network interface module is not critical to the invention. For instance, the interface type could be Peripheral Component Interconnect (PCI) or another type and the network interface module does not have to reside on a separate card. It may be included on the motherboard of the computer or even possibly built into the processor in the future.

Through the wireless network interface module, the wireless computing device 100 may communicate with different types of wireless networks. For instance, in the illustrated environment of FIG. 2, the wireless device 100 may be connected wirelessly to an infrastructure network 230 through an access point 231 thereof. The wireless device 100 may also be part of a peer-to-peer network 220, also referred to as an ad hoc network, that includes other wireless devices, such as the wireless devices 221, 222, and 223. Before connecting to either the access point 231 of the infrastructure network or the ad hoc network 220, the wireless device 100 may be in a state of searching for devices that belong to the network by periodically scanning actively by sending probe requests and scanning for probe response signals transmitted by the access point or other devices. Alternatively, the wireless device 100 may search passively by scanning for beacons transmitted by Access Points.

A network driver 210 controls the operation of the network interface module 201. The network driver 210 is either part of the operating system of the wireless device 100 or a separate executable program running on the wireless device 100. An exemplary network driver is the Windows Management Instrument (WMI) of Microsoft Corporation. The network driver is in communication with a wireless zero configuration service (wzcsvc) 202, which dynamically connects to wireless networks based on the sets of available networks and configured preferred networks. The wireless zero configuration service 202 includes a scanning engine 204 and scanning period algorithm 206 for managing the scanning period of the network interface module 201 in accordance with the invention as described below. The device 100 further includes a database 206 for storing scanning history data, which are used in the scheme of the invention for determining a scanning interval for the network interface module as will be described in greater detail below. The wireless zero configuration service 202 and the scanning history database 208 may reside in the system memory 104, the removable storage 108 or the non-removable storage 110 in FIG. 1. While the scanning engine 204 and scanning period algorithm are shown as part of the wireless zero configuration service, it is recognized that the scanning engine and scanning period algorithm may be separate from the wireless zero configuration service, part of the operating system, or part of another module in the wireless device 100.

In the description that follows, the invention will be described with reference to acts and symbolic representations of operations that are performed by one or more wireless devices, unless indicated otherwise. As such, it will be understood that such acts and operations, which are at times referred to as being computer-executed, include the manipulation by the processing unit of the device of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 3:
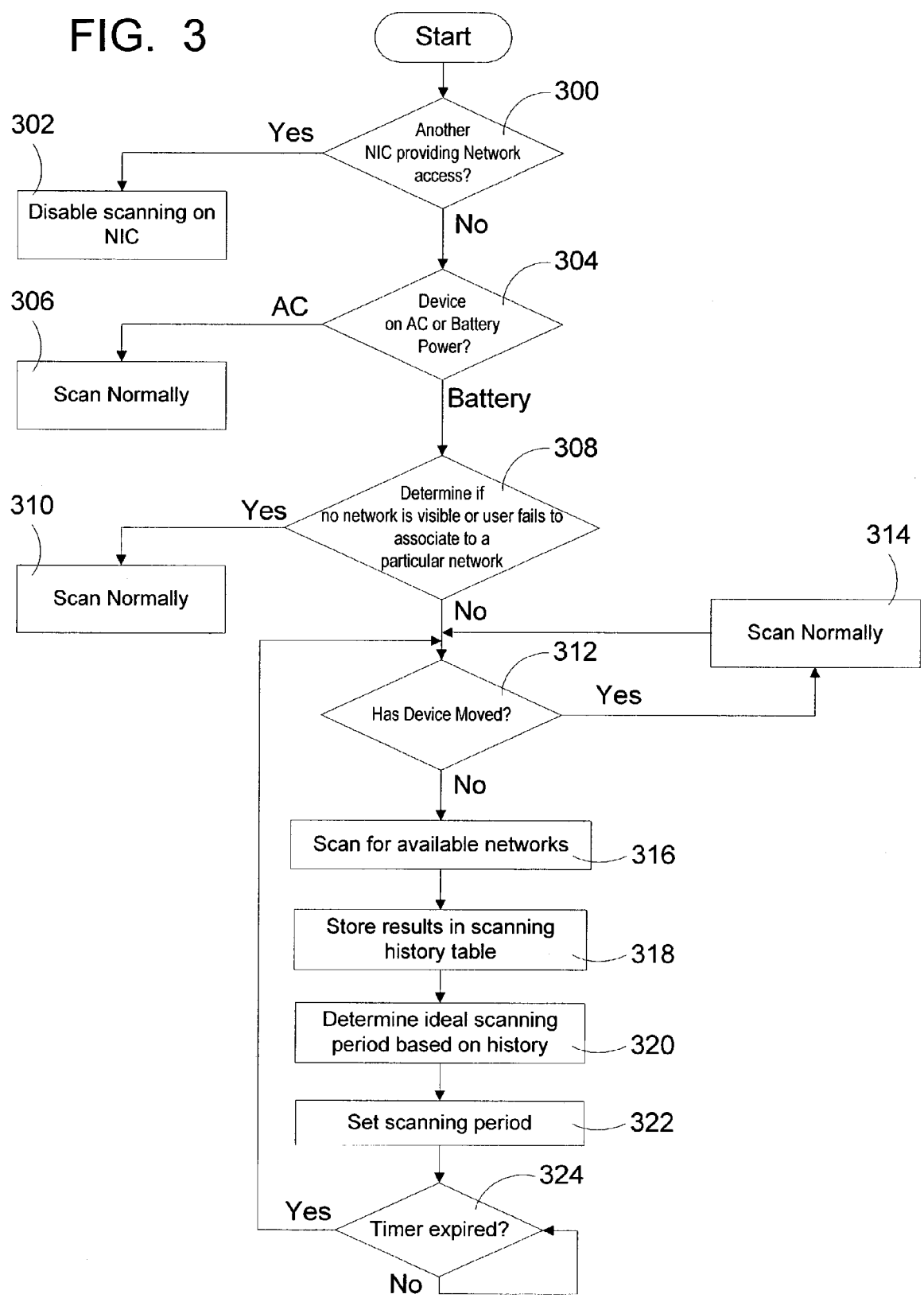
FIG. 3 is a flowchart showing the steps for managing the scanning in a wireless device.

Turning now to FIG. 3 in view of FIG. 2, scanning is intended to ensure that a wireless device 100 can roam successfully. On some wireless devices, there may be multiple network interface cards. The scanning engine 204 determines if the NIC 201 is providing access or if another NIC is providing access (step 300). If another NIC is providing access, the scanning on NIC 201 is wasted power and the NIC should be disabled. Even if the NIC 201 is enabled, the scanning engine 204 disables scanning (step 302). Alternatively, the scanning engine 204 scans at the maximum scanning interval.

The scanning engine 202 determines if the wireless device 100 is operating on ac power or on battery (step 304). The determination may be done by the scanning engine 202 or other components in the wireless device 100. If the wireless device 100 is operating on ac power, the scanning engine 202 instructs the NIC 201 to scan periodically using a default scanning interval (step 306). In one embodiment, the default scanning interval is once every 60 seconds.

The scanning engine determines if no network is visible (by having the NIC 201 check for energy on a network channel of interest) or if the device 100 fails to associate to a network (step 308). If no network is visible or the device 100 has failed to associate to a network, the scanning engine instructs the NIC 201 to scan periodically using the default scanning interval.

The scanning engine 202 checks to see if the device 100 is roaming (step 312). If the device 100 is roaming as determined by other modules in the NIC 201, the scanning engine 202 instructs the NIC 201 to scan periodically using the default scanning interval (step 314). Alternatively, the determination of whether to device 100 is roaming can be done by determining if any new networks are on the scan list returned by the NIC 201. Note that even when the device roams from one Access Point to another, a scan does not always need to be performed. For example, if a device is roaming from one Access Point to another Access Point within the same network (i.e., same Service Set Identifier (SSID) in IEEE 802.11 network), a scan is not required. If it is roaming within the same network from one Access Point to another Access Point then it would not require a scan to discover availability of new networks as this would be done following the expiry of the timer as described below.

If the device 100 is not moving (as determined by other modules or by determining if any new networks are on the scan list returned by the NIC 201), this typically means one of two things. The first is that the device 100 has been associated to the same access point for a predetermined period of time and the signal strength is still sufficient for the device to remain associated with the access point. The second is that the device 100 has not associated to a network and has not been associated for a predetermined period of time. If the device has not associated to a network, the scanning engine 202 instructs the NIC 201 to scan normally (step 314). Otherwise, the scanning engine 202 instructs the NIC 201 to scan for available networks (step 316). The NIC 201 returns the results of the scan to the scanning engine 202. The scanning engine 202 then stores the scan results in the scanning history table 208 (step 318). The scanning history table 208 stores the results of previous scans so that the most recent scan can be compared to previous scans.

The ideal scanning period based upon the scan results and the data in the scanning history table 208 is determined (step 320). The ideal scanning period is adaptive and increases exponentially in one embodiment (e.g., 1 minute, 2 minutes, 4 minutes, 8 minutes, 16 minutes . . . ) up to a maximum amount of time. In this embodiment, the scanning period is increased to the next level if the results of the most recent scan and the previous scan have not changed. Alternatively, the scanning period is set after a predetermined number of scan results have not changed. If any change has occurred, the scanning period is reset to the default scanning period. If the device 100 has remained in the same period for a predetermined length of time, the scanning period is set to the maximum period. In one embodiment, the maximum period is set to 16 minutes. Other maximum periods may be used. The scanning period is set and a timer is started to run for the timing period (step 322). If the timer has expired (step 324), steps 316 to 324 are repeated.

If the device 100 is roams networks while the timer is counting down, the scanning period is reset to the default scanning period. This is typically detected by the initiation of a scan when the device 100 looses association with the currently associated network and the scan results reveal the presence of a new network. The user may also reset the scanning period to the default scanning period. If the NIC 201 is actively sending or receiving traffic when a scanning period is over, the NIC 201 queues the scan until the traffic is sent/received. Additionally, triggers may be added that force the scanning period back to the default period in response to an event. For example, a trigger may be set to force the timer to be reset to the default period if the power mode of the device 100 goes to a constant awake mode, a fast power saving mode or a maximum power saving mode. The user may also specify the timer intervals if the user does not want to use the default increases in scanning intervals. For example, if the user typically only operates the device 100 in two places, the user may set up the scanning interval to go to the maximum scanning interval after a few intervals.

It can be seen that a method to conserve power has been presented by optimizing the scanning period of a wireless device. While the description has been described in terms of scanning intervals that are used in 802.11 wireless networks, the method is useable in other types of wireless networks, including Bluetooth, GPRS, Hiperlan and other wireless LAN network types that use scanning.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. A method for managing scanning in a wireless device having a network interface module, the method comprising the steps of:
    a) receiving scan results from the network interface module;
    b) storing the scan results in a scanning history table;
    c) determining a scanning period based upon a history of scan results;
    d) setting the scanning period;
    e) commanding the network interface module to scan for available networks after the scanning period has expired; and
    f) repeating steps a-e;
    further comprising the step of commanding the network interface module to scan for available networks;
    wherein the step of determining the scanning period includes:
    comparing the scan results to at least one prior scan result;
    increasing the scanning period if the scan results have not changed from the at least one prior scan result; and
    wherein the step of increasing the scanning period comprises increasing the scanning period exponentially.

2. The method of claim 1 further comprising the step of resetting the scanning period to a default period if the scan results are different from the at least one prior scan result.

3. The method of claim 1 further comprising the step of setting an initial scanning period to a default period.

4. The method of claim 3 wherein the step of setting the initial scanning period to a default period comprises setting the initial scanning period to 60 seconds.

5. The method of claim 1 wherein the steps of determining the scanning period and setting the scanning period comprises setting the scanning period to a default scanning period if the wireless device is in one of a continually awake mode and a power saving mode.

6. The method of claim 1 wherein the steps of determining the scanning period and setting the scanning period comprises setting the scanning period to a default scanning period if the wireless device is not operating on battery power.

7. The method of claim 1 further comprising the step of disabling the scanning in the network interface module if another network interface module is providing network access.

8. The method of claim 1 further comprising the step of initializing a timer to time-out the scanning period and wherein the step of commanding the network interface module to scan for available networks after the scanning period has expired comprises commanding the network interface module to scan for available networks after the timer has expired.

9. The method of claim 1 further comprising the step of setting the scanning period to a default period in response to receiving an indication of a triggering event.

10. The method of claim 1 wherein the network interface module comprises a network interface card.

11. The method of claim 10 wherein the network interface card is a Personal Computer Memory Card International Association (PCMCIA) wireless card.

12. The method of claim 1 wherein the network interface module resides on a motherboard.

13. A scanning system for use in a wireless device having a network interface module comprising:
    a scanning history table for storing scanning results; and
    a scanning engine for adjusting a scanning period based upon a history of scanning results and commanding the network interface module to scan for available networks after the scanning period has expired;
    wherein the scanning engine is programmed to perform the steps of:
    a) receiving scan results from the network interface module;
    b) storing the scan results in the scanning history table;
    c) determining a scanning period based upon a history of scan results;
    d) setting the scanning period;
    e) commanding the network interface module to scan for available networks after the scanning period has expired;
    f) repeating steps a-e; and
    wherein the scanning engine is programmed to set the scanning period using an exponential function.

14. The scanning system of claim 13 wherein the scanning engine is further programmed to reset the scanning period to a default period if a triggering event is received.

15. The method of claim 13 wherein the network interface module comprises a network interface card.

16. The metod of calim 15 wherein the network interface card is a Personal Computer Memory Card International Association (PCMCIA) wireless card.

17. The method of claim 13 wherein the network interface module resides on a motherboard.

18. A computer-readable medium having computer-executable instruction for performing steps for managing scanning in a wireless device having a network interface module, the steps comprising:

a) receiving scan results from the network interface module;
b) storing the scan results in a scanning history table;
c) setting a scanning period based upon a history of scan results;
d) commanding the network interface module to scan for available networks after the scanning period has expired; and
e) repeating steps a-d;
further comprising the step of commanding the network interface module to scan for available networks;
wherein the step of determining the scanning period includes;
comparing the scan results to at least one prior scan result;
increasing the scanning period if the scan results have not changed from the at least one prior scan result; and
wherein the step of increasing the scanning period comprises increasing the scanning period exponentially.

19. The computer readable medium of claim 18 further comprising the step of resetting the scanning period to a default period if the scan results are different from the at least one prior scan result.

20. The computer readable medium of claim 18 further comprising the step of setting an initial scanning period to a default period.

21. The computer readable medium of claim 20 wherein the step of setting the initial scanning period to a default period comprises setting the initial scanning period to 60 seconds.

22. The computer readable medium of claim 18 wherein the steps of determining the scanning period and setting the scanning period comprises setting the scanning period to a default scanning period if the wireless device is in one of a continually awake mode and a power saving mode.

23. The computer readable medium of claim 18 wherein the steps of determining the scanning period and setting the scanning period comprises setting the scanning period to a default scanning period if the wireless device is not operating on battery power.

24. The computer readable medium of claim 18 further comprising the step of disabling the scanning in the network interface module if another network interface module is providing network access.

25. The computer readable medium of claim 18 further comprising the step of initializing a timer to time-out the scanning period and wherein the step of commanding the network interface module to scan for available networks after the scanning period has expired comprises commanding the network interface module to scan for available networks after the timer has expired.

26. The computer readable medium of claim 18 further comprising the step of setting the scanning period to a default period in response to receiving an indication of a triggering event.

* * * * *